United States Patent
Lee et al.

(10) Patent No.: US 9,437,898 B2
(45) Date of Patent: Sep. 6, 2016

(54) SECONDARY BATTERY INCLUDING PLURALITY OF ELECTRODE ASSEMBLIES

(71) Applicant: LG CHEM, LTD., Seoul (KR)

(72) Inventors: Sun Woo Lee, Daejeon (KR); Hyun Jong Yang, Daejeon (KR); Jae Dong Chang, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/283,650

(22) Filed: May 21, 2014

(65) Prior Publication Data

US 2014/0255762 A1    Sep. 11, 2014

Related U.S. Application Data

(63) Continuation of application No. PCT/KR2014/000083, filed on Jan. 6, 2014.

(30) Foreign Application Priority Data

Jan. 7, 2013 (KR) .................. 10-2013-0001712

(51) Int. Cl.
*H01M 10/04* (2006.01)
*H01M 10/0585* (2010.01)
*H01M 4/02* (2006.01)

(52) U.S. Cl.
CPC ......... *H01M 10/0436* (2013.01); *H01M 10/04* (2013.01); *H01M 10/0413* (2013.01); *H01M 10/0585* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 6,664,006 B1 | 12/2003 | Munshi | |
| 6,911,273 B2 | 6/2005 | Faris | |
| 2001/0005561 A1 | 6/2001 | Yamada et al. | |
| 2005/0233219 A1* | 10/2005 | Gozdz et al. | 429/231.95 |
| 2009/0211918 A1 | 8/2009 | Hardee | |
| 2011/0045335 A1 | 2/2011 | Lee et al. | |
| 2012/0015223 A1* | 1/2012 | Bhardwaj et al. | 429/94 |
| 2012/0015236 A1 | 1/2012 | Spare | |
| 2012/0225345 A1 | 9/2012 | Kim | |
| 2013/0131745 A1* | 5/2013 | Viavattine | 607/9 |
| 2014/0072850 A1 | 3/2014 | Kwon et al. | |
| 2015/0221988 A1* | 8/2015 | Kwon | H01M 10/052 429/94 |

FOREIGN PATENT DOCUMENTS

| | | |
|---|---|---|
| EP | 2 924 794 A1 | 9/2015 |
| JP | 3611765 B2 | 1/2005 |
| JP | 2010-097730 A | 4/2010 |

(Continued)

OTHER PUBLICATIONS

Supplementary European Search Report mailed May 10, 2016 in corresponding EP Applicaiton No. 14711438.

*Primary Examiner* — Patrick Ryan
*Assistant Examiner* — Haixia Zhang
(74) *Attorney, Agent, or Firm* — Birch, Stewart, Kolasch & Birch, LLP

(57) ABSTRACT

Disclosed is a secondary battery including a plurality of electrode assemblies. The secondary battery includes a first electrode assembly including a first cathode, a first separator and a first anode, and a second electrode assembly including a second cathode, a second separator and a second anode, wherein, when an electrode plate area of the second electrode assembly is smaller than that of the first electrode assembly, a cross-sectional thickness of the second electrode assembly is larger than that of the first electrode assembly.

14 Claims, 1 Drawing Sheet

(56) References Cited

FOREIGN PATENT DOCUMENTS

| | | |
|---|---|---|
| JP | 2015-513772 A | 5/2015 |
| KR | 10-2003-0066960 A | 8/2003 |
| KR | 10-0440934 B1 | 7/2004 |
| KR | 10-2010-0109873 A | 10/2010 |
| TW | 521450 B | 2/2003 |
| TW | 543230 B | 7/2003 |
| TW | 200840120 A | 10/2008 |
| WO | WO 2013/180482 A1 | 12/2013 |

* cited by examiner

SECONDARY BATTERY INCLUDING PLURALITY OF ELECTRODE ASSEMBLIES

CROSS REFERENCE TO RELATED APPLICATIONS

This application is a continuation of PCT International Application No. PCT/KR2014/000083 filed on Jan. 6, 2014, which claims priority under 35 U.S.C 119(a) to Application No. 10-2013-0001712 filed on Jan. 7, 2013 in the Republic of Korea, all of which are hereby expressly incorporated by reference into the present application.

FIELD OF THE INVENTION

The present invention relates to a secondary battery including a plurality of electrode assemblies.

BACKGROUND OF THE ART

In existing structures of secondary batteries and battery packs, the use and arrangement of secondary batteries may be limited. Particularly, a battery pack is generally configured with quadrangular batteries having the same capacity, size and dimension. The physical shape of a secondary battery reflects the electrical arrangement of the secondary battery. For example, a battery pack having six electrode assemblies may include six electrode assemblies having the same size and capacity. In the battery pack, the electrode assemblies may be parallelly provided in two rows—each having three electrode assemblies. However, this general type of secondary battery or battery pack may not be effectively used in a space having a non-quadrangular or irregular shape for a portable electronic device or a large capacity vehicle battery. Therefore, a plurality of electrode assemblies having different shapes from each other may be provided in order to effectively use the available space. In this case, the output thereof may not be constant due to the difference in capacity of each electrode assembly.

SUMMARY OF THE INVENTION

An aspect of the present invention provides a secondary battery including electrode assemblies of similar capacity, in which a cross-sectional thickness of each electrode assembly is increased, while an electrode plate area thereof is reduced.

According to another aspect of the present invention, there is provided a secondary battery including a first electrode assembly including a first cathode, a first separator and a first anode; and a second electrode assembly including a second cathode, a second separator and a second anode, wherein, when an electrode plate area of the second electrode assembly is smaller than that of the first electrode assembly, a cross-sectional thickness of the second electrode assembly is larger than that of the first electrode assembly.

Effect of the Invention

According to the present invention, when the electrode plate area of the electrode assembly is small, the cross-sectional thickness thereof is increased so that the power of the electrode assembly is constantly output, and thus a phenomenon in which an electric load is concentrated between the electrode assemblies is lessened, and power is output constantly, so that the secondary battery may be used effectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
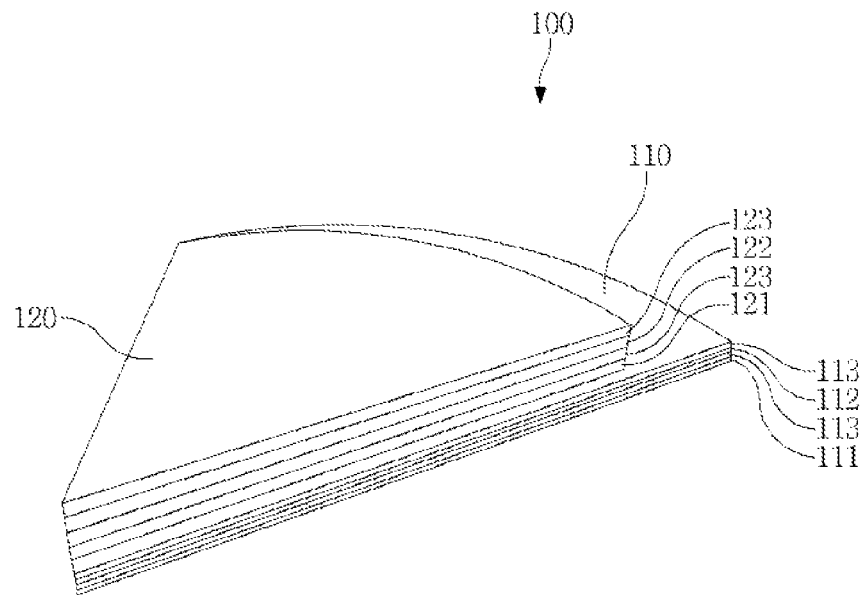
FIG. 1 is a schematic view of a secondary battery according to one embodiment of the present invention.

The present invention provides a secondary battery including a first electrode assembly including a first cathode, a first separator and a first anode; and a second electrode assembly including a second cathode, a second separator and a second anode, wherein, when an electrode plate area of the second electrode assembly is smaller than that of the first electrode assembly, a cross-sectional thickness of the second electrode assembly is larger than that of the first electrode assembly.

A secondary battery according to one embodiment of the present invention may be efficiently used in a space having a non-quadrangular or irregular shape due to a difference in the electrode plate area of each electrode assembly. Further, in the secondary battery according to one embodiment of the present invention, a shortened service life of the secondary battery due to a difference in capacity between the electrode assemblies and inefficiency that arises from not using the electrode assembly having a remaining capacity, which occur in a conventional secondary battery, may be solved by changing the cross-sectional thickness according to the electrode plate area. Also, each of the electrode assemblies may be adapted to have a similar capacity, and thus the outputs thereof may be maintained to be constant.

In the secondary battery according to one embodiment of the present invention, the electrode plate area of the first electrode assembly and the electrode plate area of the second electrode assembly may be expressed by the following Equation 1:

$$0.5 \leq S_2/S_1 \leq 0.98 \qquad \text{[Equation 1]}$$

where $S_1$ is the electrode plate area of the first electrode assembly, and $S_2$ is the electrode plate area of the second electrode assembly.

Further, the cross-sectional thickness of the first electrode assembly and the cross-sectional thickness of the second electrode assembly may be expressed by the following Equation 2:

$$0 \leq I_1/I_2 \leq 0.2 \qquad \text{[Equation 2]}$$

where $I_1$ is the cross-sectional thickness of the first electrode assembly, and $I_2$ is the cross-sectional thickness of the second electrode assembly.

That is the surface area of the second electrode assembly may be smaller than that of the first electrode assembly by a rate designated by Equation 1. However, the first electrode assembly and the second electrode assembly may have the same or almost the same battery capacity. If a difference in the battery capacity between the first electrode assembly and the second electrode assembly occurs, the life span of one of the electrode assemblies, which has a smaller capacity, is shortened by repeated charging and discharging cycles. And, another electrode assembly that has a larger capacity always has remaining capacity and is thus inefficient. Therefore, the cross-sectional thickness of the second electrode assembly may be provided to be larger than that of the first electrode assembly, or an electrode material of the second electrode assembly may be provided to have higher efficiency than that of the first electrode assembly.

When the first and second electrode assemblies have the same electrode material, if the surface area of the second electrode assembly is set to be smaller than that of the first electrode assembly, the second electrode assembly has a smaller capacity than that of the first electrode assembly. In order to overcome the capacity difference, the cross-sectional thickness of the second electrode assembly is set to be greater than that of the first electrode assembly. Specifically, a cathode coating portion of a second cathode and an anode coating portion of a second anode of the second electrode assembly may be respectively provided to be thicker than those of first cathode and anode of the first electrode assembly, such that the electrode assemblies have the same battery capacity.

Alternatively, the first and second electrode assemblies may use electrode materials that are different from each other. Specifically, the electrode material used for the second electrode assembly may have a higher efficiency than that used for the first electrode assembly.

In the secondary battery according to one embodiment of the present invention, the first cathode and the second cathode may have a cathode collector having a cathode active material coated on one or both surfaces thereof.

The standard capacity per unit area of the first cathode may be 0.0121 to 0.0123 Ah/cm$^2$. If the standard capacity per unit area of the first cathode is less than 0.0121 Ah/cm$^2$, the efficiency of capacity design is reduced by a decrease in the capacity per unit area. If the standard capacity per unit area of the first cathode is more than 0.0123 Ah/cm$^2$, electrolyte impregnation is reduced according to an increase in rolling intensity after the electrode coating.

A standard capacity per unit area of the second cathode may be 0.0123 to 0.0126 Ah/cm$^2$. It the standard capacity per unit area of the second cathode may be less than 0.0123 Ah/cm$^2$, the efficiency in capacity design is reduced by the decrease in capacity per unit area. If the standard capacity per unit area of the first cathode is more than 0.0126 Ah/cm$^2$ the electrolyte impregnation is reduced according to the increase in rolling intensity after the electrode coating.

Further, in the secondary battery according to one embodiment of the present invention, the first anode and the second anode may have an anode collector having an anode active material coated one or both surfaces thereof.

A standard capacity per unit area of the first anode may be 0.0132 to 0.0136 Ah/cm$^2$. If the standard capacity per unit area of the first anode is less than 0.0132 Ah/cm$^2$, lithium may be extracted in the battery. If the standard capacity per unit area of the first anode is more than 0.0136 Ah/cm$^2$, there a limitation arises in terms of price competitiveness due to an increased loading amount.

A standard capacity per unit area of the second anode may be 0.0135 to 0.0139 Ah/cm$^2$. If the standard capacity per unit area of the first anode is less than 0.0135 Ah/cm$^2$, the lithium may be extracted from the battery. If the standard capacity per unit area of the first anode is more than 0.0139 Ah/cm$^2$, efficiency in capacity design and price competitiveness may be reduced.

In the secondary battery according to one embodiment of the present invention, the electrode assembly may have a simple stacking type structure and a stacking-folding type structure. The electrode assembly may be prepared by interposing a separator between the cathode and the anode which are coated with the active materials and then sequentially stacking the cathode/the separator/the anode. Meanwhile, the electrode assembly may include the plurality of electrodes and separators which are alternately stacked.

According to one embodiment of the present invention, the electrode assembly may be prepared by repeatedly stacking the cathode/the separator/the anode or the anode/the separator/the cathode, or may be prepared by assembling a plurality of unit cells having a full cell or bi-cell structure using a folding film. Here, the folding film may be a general insulation film. The full cell structure includes at least one or more cell structures in which the separator is interposed between two electrodes having different polarity from each other, wherein the outermost electrodes may have different polarity from each other. For example, the full cell structure may have a structure of the cathode/the separator/the anode, the cathode/the separator/the anode/the separator/the cathode/the separator/the anode or the like. The bi-cell structure includes at least one or more cell structures in which the separator is interposed between two electrodes having different polarity from each other, wherein the outermost electrodes may have the same polarity. For example, the bi-cell structure may have a structure of the cathode/the separator/the anode/the separator/the cathode, the anode/the separator/the cathode/the separator/the anode or the like.

Meanwhile, there are various methods of assembling the unit cells using the folding film. As an example, the electrode assembly may be prepared by arranging the plurality of unit cells at regular intervals on one surface of the folding film which extends in a length direction and then winding the folding film together with the arranged unit cells in one direction. In the prepared electrode assembly, the unit cells are inserted into the wound film. As another example, the electrode assembly may be prepared by arranging the plurality of unit cells at regular intervals on both surfaces of the folding film to extend in the length direction and then winding the folding film together with the arranged unit cells in one direction.

In the prepared electrode assembly, the unit cells are inserted into the wound film. The arrangement interval of the unit cells and the polarity of the outermost electrodes are selected so that the electrodes of upper and lower cells which are in contact with the folding film have opposite polarity to each other. For example, the arrangement interval of the unit cells and the polarity of the outermost electrodes are selected so that the electrode assembly has a structure of the cathode/the separator/the anode/the folding film/the cathode/the separator/the anode/the folding film/the cathode and so on.

Meanwhile, a length of the folding film used in the preparing of the electrode assembly may be selected so as to wrap the electrode assembly at least one or more times in a state in which the final unit cell or electrode are assembled in the above-mentioned manner. However, the electrode assemblies may be modified variously, and are not limited thereto.

Also, one embodiment of the present invention provides a medium and large size battery module characterized by including the two or more secondary batteries which are electrically connected.

Also, one embodiment of the present invention provides a medium and large size battery pack characterized by including the two or more medium and large size battery modules which are electrically connected.

In order to be used as a power source for electric vehicles (EVs) which may be driven only by the battery, hybrid electric vehicles (HEVs) which use an existing engine with the battery and so on, high power and large capacity are required. To this end, the battery pack may be configured by electrically connecting the two or more battery modules according to one embodiment of the present invention in series or, if necessary, in parallel. The medium and large size battery pack may be used as a power source for at least one or more medium and large size devices such as power tools; electric vehicles (EVs) including hybrid electric vehicles (HEVs) and plug-in hybrid electric vehicles (PHEVs); electric trucks; electric commercial vehicles; and electric power storing systems.

Hereinafter, exemplary embodiments of the present invention will now be described in detail with reference to the accompanying drawings. Here, it should be understood that the terms used in the specification and the appended claims should not be construed as limited to general and dictionary meanings, but should be interpreted based on the meanings and concepts corresponding to technical aspects of the present invention on the basis of the principle that the inventor may define terms appropriately in order to provide the best explanation possible.

Therefore, the description proposed herein is just a preferable example for the purpose of illustration only, and not intended to limit the scope of the invention, so it should be understood that other equivalents and modifications could be made thereto without departing from the spirit and scope of the invention.

FIG. 1 is a schematic view of a secondary battery 100 according to one embodiment of the present invention, wherein the two electrode assemblies are stacked.

Referring to FIG. 1, a first electrode assembly 110 in which a first cathode 111, a first separator 113, a first anode 112 and a first separator 113 are stacked in turn and a second electrode assembly 120 in which a second cathode 121, a second separator 123, a second anode 122 and a second separator 123 are stacked in turn are stacked in a stacking type configuration. An electrode plate area of the second electrode assembly 120 is smaller than that of the first electrode assembly 110, but the cross-sectional thickness of the second electrode assembly 120 is larger than that of the first electrode assembly 110.

In order to be used as a large size vehicle battery as well as for various types of mobile phones, notebooks and tablet PCs, the pyramid-shaped secondary battery 100 according to one embodiment of the present invention may be configured so that the electrode plate areas of the first and second electrode assemblies 110 and 120 are different from each other. In the secondary battery in which the first and second electrode assemblies 110 and 120 are stacked, since the electrode plate area of the second electrode assembly 120 is smaller than that of the first electrode assembly 110 so that the surface area on which the active material is coated also becomes smaller, the capacity of the second electrode assembly 120 may be reduced. However, the capacity different therebetween may be offset by increasing the cross-sectional thickness of the second electrode assembly 120 and thickly coating the second electrode assembly 120 having the increased cross-sectional thickness corresponding to the reduced capacity with the electrode active material.

Therefore, as the electrode assembly has smaller capacity and also, charging and discharging processes are repeated more often, the life span of the electrode assembly may become shorter due to the capacity difference between the stacked electrode assemblies. Also, the electrode assembly having the remaining capacity may not be used completely. However, according to one embodiment of the present invention, the capacity difference due to a difference in the electrode plate area may be offset by increasing the cross-sectional thickness, and the power may be output constantly by providing a secondary battery in which the electrode assemblies having a similar capacity are stacked.

Figure 2:
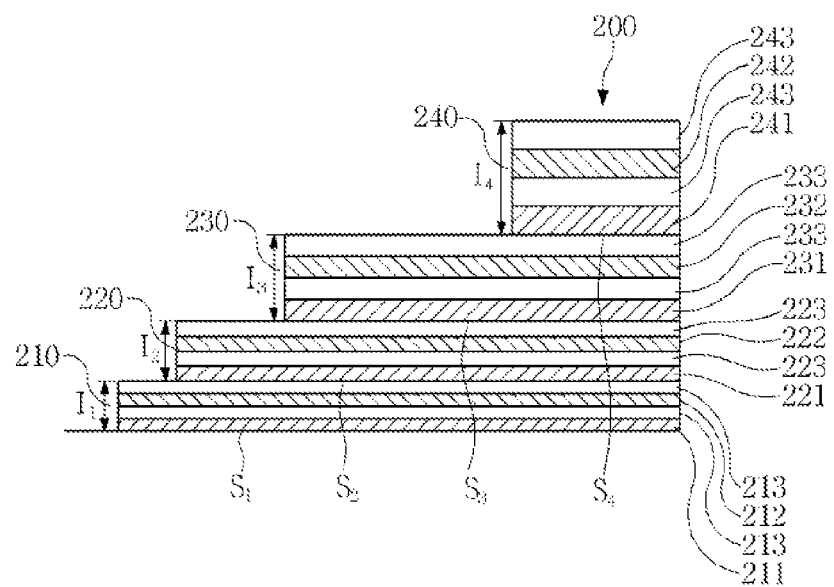
FIG. 2 is a cross-sectional view of the secondary battery according to one embodiment of the present invention.

FIG. 2 is a cross-sectional view of the secondary battery according to one embodiment, of the present invention.

As illustrated in FIG. 2, a secondary battery 200 may be manufactured by providing the plurality of secondary batteries 100 in which the electrode assemblies of FIG. 1 are stacked. More specifically, a first electrode assembly 210 in which a first cathode 211, a first separator 213, a first anode 212 and a first separator 213 are stacked in turn and a second electrode assembly 220 in which a second cathode 221, a second separator 223, a second anode 222 and a second separator 223 are stacked in turn may be stacked in a stacking type configuration. A third electrode assembly 230 in which a third cathode 231, a third separator 233, a third anode 232 and a third separator 233 are stacked in turn and a fourth electrode assembly 240 in which a fourth cathode 241, a fourth separator 243, a fourth anode 242 and a fourth separator 243 are stacked in turn may be stacked in a stacking type configuration. In the secondary battery including the first electrode assembly 210, the second electrode assembly 220, the third electrode assembly 230 and the fourth electrode assembly 240, one or more electrode assemblies have electrode plate areas smaller than that of the fourth electrode assembly 240 and a cross-sectional thicknesses greater than that of the fourth electrode assembly 240.

Further, an electrode plate area $S_1$ of the first electrode assembly 210 is greater than that $S_2$ of the second electrode assembly 220, an electrode plate area $S_2$ of the second electrode assembly 220 is greater than that $S_3$ of the third electrode assembly 230, and an electrode plate area $S_3$ of the third electrode assembly 230 is greater than that $S_4$ of the fourth electrode assembly 240. However, a cross-sectional thickness $I_1$ of the first electrode assembly 210 is smaller, than that $I_2$ of the second electrode assembly 220, a cross-sectional thickness $I_2$ of the second electrode assembly 220 is smaller than that $I_3$ of the third electrode assembly 230, and cross-sectional thickness $I_3$ of the third electrode assembly 230 is smaller than that $I_4$ of the fourth electrode assembly 240.

Specifically, a cathode coating portion of the second cathode 221 and an anode coating portion of the second anode 222 of the second electrode assembly 220 are respectively provided to be thicker than a cathode coating portion of the first cathode 211 and an anode coating portion of the first anode 212 of the first electrode assembly 210, such that electrode assemblies having the same battery capacity may be provided. Thickness control of the cathode and anode coating portions may be equally applied to the third and fourth electrode assemblies 230 and 240.

Therefore, since the secondary battery in which the electrode assemblies having a similar capacity is manufactured, a capacity difference between the stacked electrode assemblies is not generated, and thus the limitation that life span is shortened by repeated charging and discharging processes does not occur, and the limitation in which the electrode assembly has a remaining capacity that is not completely used does not occur. Since the electrode assemblies having similar capacity are stacked, the power may be output constantly.

Further, high power and large capacity are required in order to be used as a power source for electric vehicles (EVs) which are driven only by a battery, hybrid electric vehicles (HEVs) which use an existing engine with a battery and so on. To this end, the battery module may be configured by electrically connecting the two or more secondary battery according to one embodiment of the present invention in series if necessary, in parallel, and the battery pack may also be configured by electrically connecting the two or more battery modules.

While the present invention has been shown and described in connection with the exemplary embodiments, it will be apparent to those skilled in the art that modifications and variations can be made without departing from the spirit and scope of the invention as defined by the appended claims.

What is claimed is:

1. A secondary battery comprising:
   a first electrode assembly comprising a first cathode, a first separator and a first anode; and
   a second electrode assembly comprising a second cathode, a second separator and a second anode,
   wherein the second electrode assembly is stacked on the first electrode assembly,
   wherein an electrode plate area of the second electrode assembly is smaller than an electrode plate area of the first electrode assembly,
   wherein a cross-sectional thickness of the second electrode assembly is larger than a cross-sectional thickness of the first electrode assembly,
   wherein the electrode plate area of the first electrode assembly and the electrode plate area of the second electrode assembly are expressed by the following Equation:

$$0.5 \leq S_2/S_1 \leq 0.98$$

where $S_1$ is the electrode plate area of the first electrode assembly, and $S_2$ is the electrode plate area of the second electrode assembly,
   wherein the cross-sectional thickness of the first electrode assembly and the cross-sectional thickness of the second electrode assembly are expressed by the following Equation:

$$0 \leq I_1/I_2 \leq 0.2$$

where $I_1$ is the cross-sectional thickness of the first electrode assembly, and $I_2$ is the cross-sectional thickness of the second electrode assembly, and
   wherein the electrode material used for the second electrode assembly has a higher efficiency than that used for the first electrode assembly.

2. The secondary battery of claim 1, wherein a cathode coating portion of the second cathode of the second electrode assembly is thicker than that of the first cathode of the first electrode assembly.

3. The secondary battery of claim 1, wherein an anode coating portion of the second anode of the second electrode assembly is thicker than that of the first anode of the first electrode assembly.

4. The secondary battery of claim 1, wherein the first cathode and the second cathode have a cathode collector in which a cathode active material is coated on one or both surfaces thereof.

5. The secondary battery of claim 1, wherein a standard capacity per unit area of the first cathode is 0.0121 to 0.0123 Ah/cm$^2$.

6. The secondary battery of claim 1, wherein a standard capacity per unit area of the second cathode is 0.0123 to 0.0126 Ah/cm$^2$.

7. The secondary battery of claim 1, wherein the first anode and the second anode have an anode collector in which an anode active material is coated on one or both surfaces thereof.

8. The secondary battery of claim 1, wherein a standard capacity per unit area of the first anode is 0.0132 to 0.0136 Ah/cm$^2$.

9. The secondary battery of claim 1, wherein a standard capacity per unit area of the second anode is 0.0135 to 0.0139 Ah/cm$^2$.

10. The secondary battery of claim 1, wherein the first electrode assembly and the second electrode assembly have the same battery capacity.

11. A medium or large size battery module comprising two or more secondary batteries of claim 1 which are electrically connected with each other.

12. A medium or large size battery pack comprising two or more battery modules of claim 11 which are electrically connected with each other.

13. The secondary battery of claim 1, wherein a standard capacity per unit area of the first cathode is 0.0121 to 0.0123 Ah/cm$^2$, and
    wherein a standard capacity per unit area of the second cathode is 0.0123 to 0.0126 Ah/cm$^2$.

14. The secondary battery of claim 1, wherein a standard capacity per unit area of the first anode is 0.0132 to 0.0136 Ah/cm$^2$, and
    wherein a standard capacity per unit area of the second anode is 0.0135 to 0.0139 Ah/cm$^2$.

* * * * *